United States Patent
Sugiura et al.

(10) Patent No.: US 8,466,633 B2
(45) Date of Patent: Jun. 18, 2013

(54) ILLUMINATION CONTROLLING DEVICE FOR VEHICLE

(75) Inventors: Masayuki Sugiura, Anjo (JP); Takaaki Muramatsu, Anjo (JP); Atsushi Nishiyama, Kariya (JP); Ryuji Suzuki, Kariya (JP); Shinji Suganuma, Toyota (JP)

(73) Assignees: DENSO CORPORATION, Kariya (JP); Toyota Jidosha Kabushiki Kaisha, Toyota (JP)

( * ) Notice: Subject to any disclaimer, the term of this patent is extended or adjusted under 35 U.S.C. 154(b) by 222 days.

(21) Appl. No.: 12/932,324

(22) Filed: Feb. 23, 2011

(65) Prior Publication Data
US 2011/0204788 A1 Aug. 25, 2011

(30) Foreign Application Priority Data
Feb. 24, 2010 (JP) ................................ 2010-039090

(51) Int. Cl.
*G05F 1/00* (2006.01)

(52) U.S. Cl.
USPC ............... 315/292; 315/297; 315/80; 315/77; 362/466; 362/464; 362/487; 345/77; 345/204; 340/472

(58) Field of Classification Search
USPC ........ 315/77, 80, 79, 292, 297, 362; 340/472, 340/815.45, 815.4, 815.67; 362/470, 471, 362/487–489, 464, 466; 345/77, 102, 204, 345/690
See application file for complete search history.

(56) References Cited

U.S. PATENT DOCUMENTS

| | | | | |
|---|---|---|---|---|
| 6,717,376 | B2 * | 4/2004 | Lys et al. | 315/292 |
| 6,969,183 | B2 * | 11/2005 | Okubo et al. | 362/466 |
| 7,598,927 | B2 * | 10/2009 | Yamazaki et al. | 345/7 |
| 8,049,722 | B2 * | 11/2011 | Kumon | 345/158 |
| 8,274,459 | B2 * | 9/2012 | Kato et al. | 345/87 |
| 2010/0103204 | A1 | 4/2010 | Shibata et al. | |

FOREIGN PATENT DOCUMENTS

| | | |
|---|---|---|
| JP | U-3-99657 | 10/1991 |
| JP | 6-318050 | 11/1994 |
| JP | 2008-158497 | 7/2008 |
| JP | 2009-40129 | 2/2009 |
| JP | 2009-244033 | 10/2009 |

OTHER PUBLICATIONS

Office Action mailed Mar. 14, 2013 in the corresponding Chinese patent application No. 201110047243.7.

* cited by examiner

*Primary Examiner* — Haiss Philogene
(74) *Attorney, Agent, or Firm* — Harness, Dickey & Pierce, PLC

(57) ABSTRACT

An illumination controlling device for a vehicle includes a controlling portion to change a luminance phase of a meter based on operation of an operating portion and to maintain a luminance phase of a lighting while the lighting is extinguished. The controlling portion changes the luminance phase of the meter based on the operation of the operating portion and changes the luminance phase of the lighting to correspond to the luminance phase of the meter if the operating portion is operated in a state that the luminance phase is different between the meter and the lighting while the lighting is illuminated.

6 Claims, 10 Drawing Sheets

| | LUMINANCE PHASE OF METER | | LUMINANCE PHASE OF LIGHTING |
|---|---|---|---|
| | BRIGHT ENVIRONMENT | DARK ENVIRONMENT | |
| | Ta | Tb | Tc |
| BRIGHT | Step1 (100%) | Step1 (100%) | Step1 (100%) |
| | Step2 (75%) | Step2 (33%) | Step2 (66.7%) |
| | Step3 (50%) | Step3 (12.5%) | Step3 (40%) |
| | Step4 (37.5%) | Step4 (6.25%) | Step4 (20%) |
| | Step5 (25%) | Step5 (2%) | Step5 (10%) |
| | Step6 (12.5%) | Step6 (0.7%) | Step6 (7%) |
| DARK | Step7 (6.25%) | Step7 (0%) | Step7 (0%) |

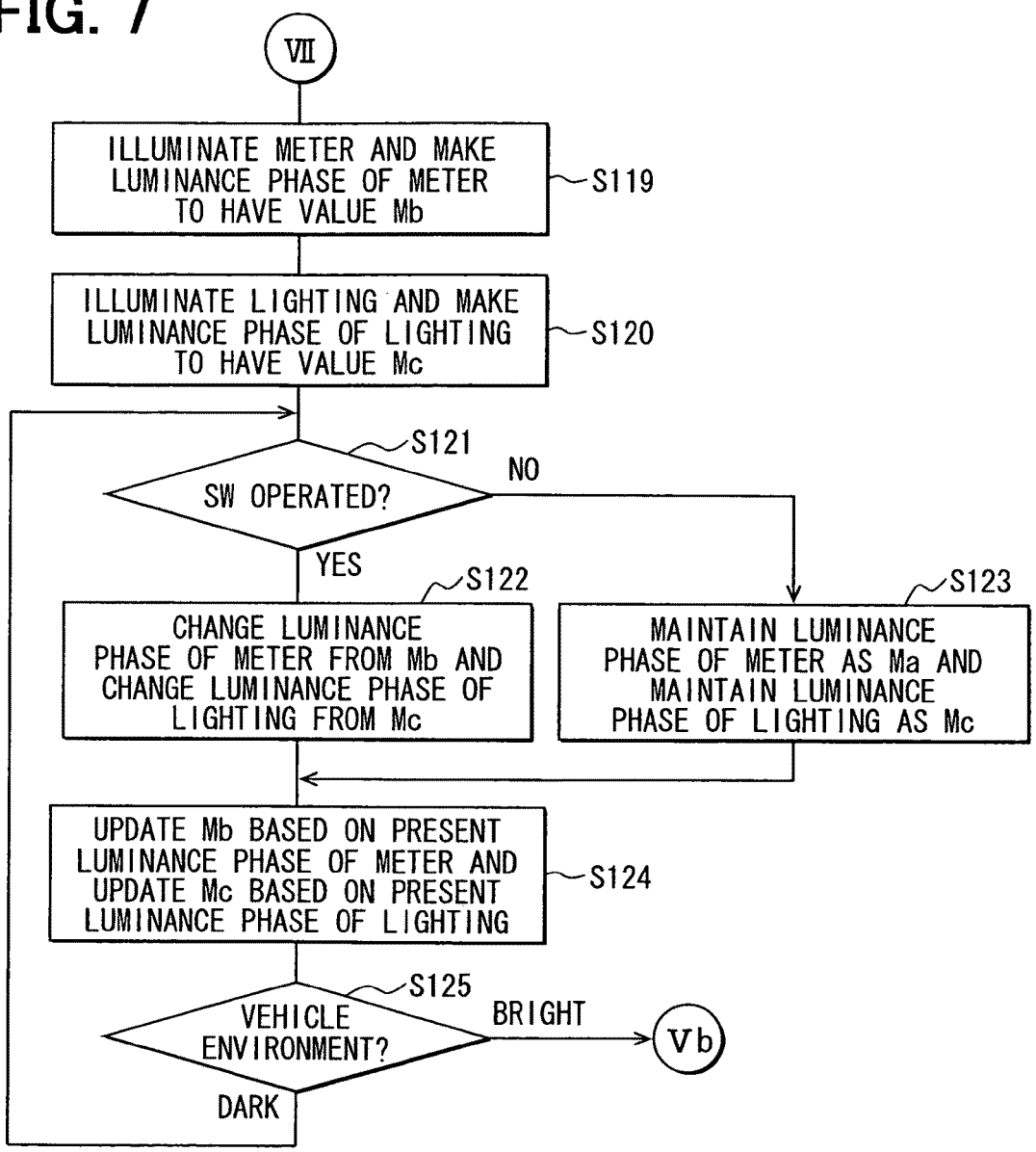

FIG. 8

| LUMINANCE PHASE OF METER | LUMINANCE PHASE OF LIGHTING | |
|---|---|---|
| Step1 | Step5 | ← DIFFERENCE |
| Step2 | Step2 | ← TRIGGER OPERATION ← CORRESPONDENCE |
| Step3 | Step3 | |
| Step4 | Step4 | |
| Step5 | Step5 | |
| Step6 | Step6 | |
| Step7 | Step7 | |
| Step1 | Step1 | |
| Step2 | Step2 | |

SWITCH OPERATION ↓

FIG. 10

| LUMINANCE PHASE OF METER | LUMINANCE PHASE OF LIGHTING | |
|---|---|---|
| Step1 | Step5 | ← DIFFERENCE ← TRIGGER OPERATION |
| Step2 | Step5 | ⎫ |
| Step3 | Step5 | ⎬ MAINTAIN |
| Step4 | Step5 | ⎪ |
| Step5 | Step5 | ⎭ ← CORRESPONDENCE |
| Step6 | Step6 | |
| Step7 | Step7 | |
| Step1 | Step1 | |
| Step2 | Step2 | |

SWITCH OPERATION ↓

FIG. 12

| LUMINANCE PHASE OF METER | LUMINANCE PHASE OF LIGHTING | |
|---|---|---|
| Step1 | Step5 | ← DIFFERENCE ← TRIGGER OPERATION |
| Step2 | Step6 | ← Mcb |
| Step3 | Step7 | ⎫ |
| Step4 | Step7 | ⎪ |
| Step5 | Step7 | ⎬ MAINTAIN |
| Step6 | Step7 | ⎪ |
| Step7 | Step7 | ← CORRESPONDENCE |
| Step1 | Step1 | |
| Step2 | Step2 | |

SWITCH OPERATION ↓

ILLUMINATION CONTROLLING DEVICE FOR VEHICLE

CROSS REFERENCE TO RELATED APPLICATION

This application is based on Japanese Patent Application No. 2010-39090 filed on Feb. 24, 2010, the disclosure of which is incorporated herein by reference in its entirety.

BACKGROUND OF THE INVENTION

1. Field of the Invention

The present invention relates to an illumination controlling device for a vehicle.

2. Description of Related Art

JP-A-6-318050 describes an illumination controlling system for a vehicle. The system controls a luminance of a meter of the vehicle stepwise in accordance with an operation of an operating portion.

In such a system, the luminance of the meter has plural luminance phases. An occupant of the vehicle can suitably change the luminance by operating the operating portion.

Generally, an air-conditioner, an audio instrument or a shift lever has a lighting to be turned on/off based on an operation of a switch such as a light switch. A luminance of the lighting is controlled stepwise in accordance with the operation of the operating portion.

In a case where the luminance of the lighting is controlled stepwise with the same operating portion as the luminance of the meter while the lighting is lighted up, the number of the luminance phases is set the same between the lighting and the meter. If the luminance becomes different between the lighting and the meter, the occupant of the vehicle may feel strange. Therefore, the luminance is required to be set approximately the same between the lighting and the meter.

However, it is not necessary to change the luminance of the lighting while the lighting is not illuminated. Therefore, in a case where only the luminance of the meter is changed while the lighting is not lighted up, the occupant may feel strange when the lighting is activated, because the luminance of the meter is different from the luminance of the lighting.

SUMMARY OF THE INVENTION

In view of the foregoing and other problems, it is an object of the present invention to provide an illumination controlling device for a vehicle.

According to an example of the present invention, an illumination controlling device for a vehicle includes a meter, a lighting, an operation switch, an illumination operating portion, and a controlling portion. The meter displays information of the vehicle. The lighting is located in a passenger compartment of the vehicle. The operation switch is operated for turning on/off the lighting. The illumination operating portion is operated for controlling a luminance of the meter and a luminance of the lighting stepwise. The controlling portion controls the meter and the lighting based on operations of the operation switch and the operating portion. The meter is set to have a plurality of luminance phases, and the lighting is set to have a plurality of luminance phases. The number of the luminance phases is set equal between the meter and the lighting. The controlling portion controls the luminance of the meter or the luminance of the lighting in accordance with the luminance phases. The controlling portion has an extinguished state controller and an illuminated state controller. The extinguished state controller changes the luminance phase of the meter based on the operation of the operating portion and maintains the luminance phase of the lighting while the lighting is extinguished by the operation switch. The illuminated state controller changes the luminance phase of the meter based on the operation of the operating portion and changes the luminance phase of the lighting to correspond to the luminance phase of the meter if the operating portion is operated in a state that the luminance phase is different between the meter and the lighting while the lighting is illuminated by the operation switch.

Accordingly, an illumination situation of the passenger compartment can be made suitable for an occupant of the vehicle.

BRIEF DESCRIPTION OF THE DRAWINGS

The above and other objects, features and advantages of the present invention will become more apparent from the following detailed description made with reference to the accompanying drawings. In the drawings:

FIG. 7 is a flow chart illustrating a control performed by the illumination controlling device;

FIG. 8 is an example of control performed by the illumination controlling device;

FIG. 10 is an example of control performed by the illumination controlling device of the second embodiment;

FIG. 12 is an example of control performed by the illumination controlling device of the third embodiment.

DETAILED DESCRIPTION OF PREFERRED EMBODIMENT

Figure 1:
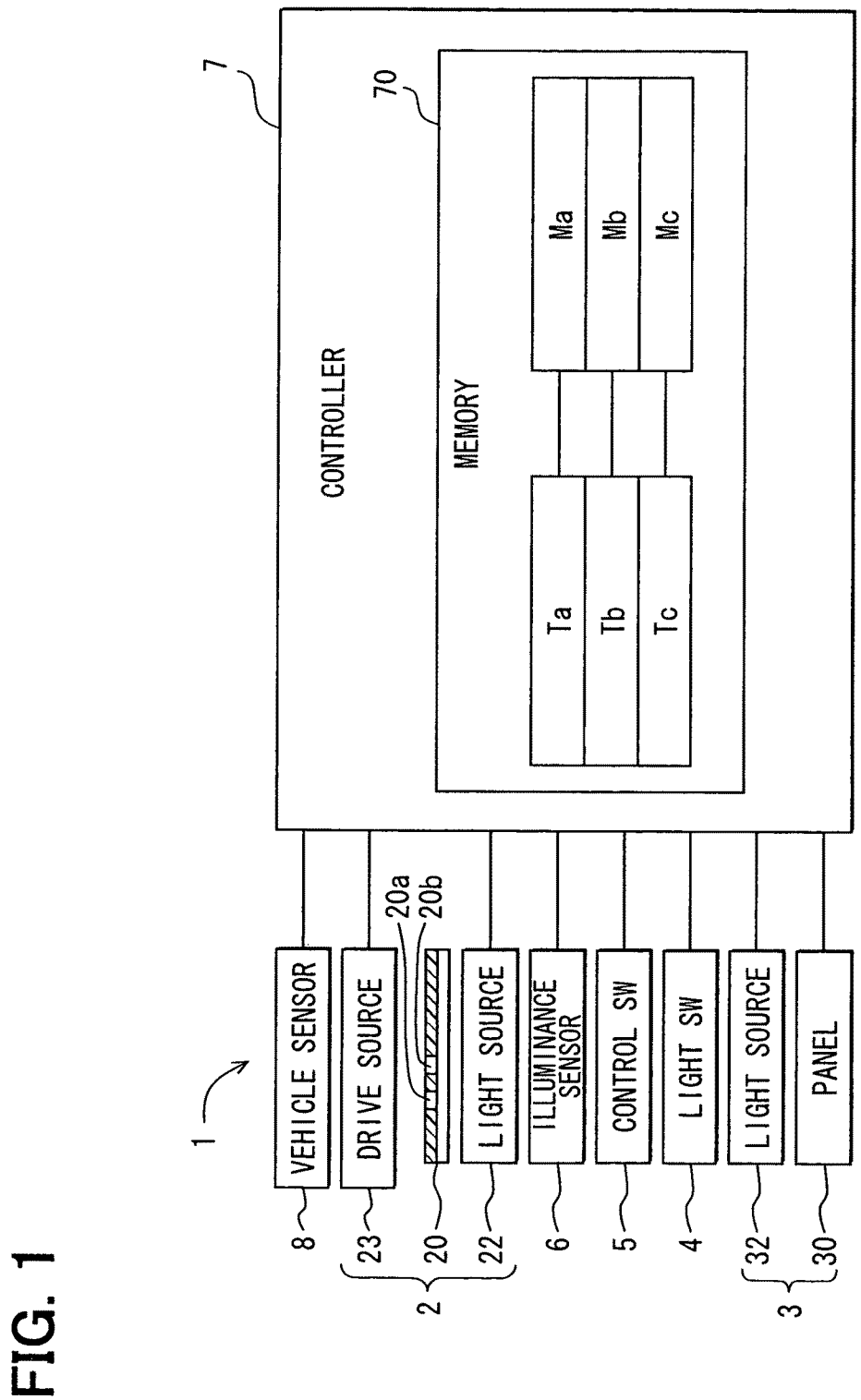
FIG. 1 is a block diagram illustrating an illumination controlling device according to a first embodiment.

It should be understood that throughout the drawings, corresponding reference numerals indicate like or corresponding parts and features.

(First Embodiment)

An illumination controlling device 1 is mounted on a vehicle. As shown in FIG. 1, the device 1 has a meter 2, a lighting 3, a light switch 4, an illumination control switch 5, an illuminance sensor 6 and a controller 7.

Figure 2:
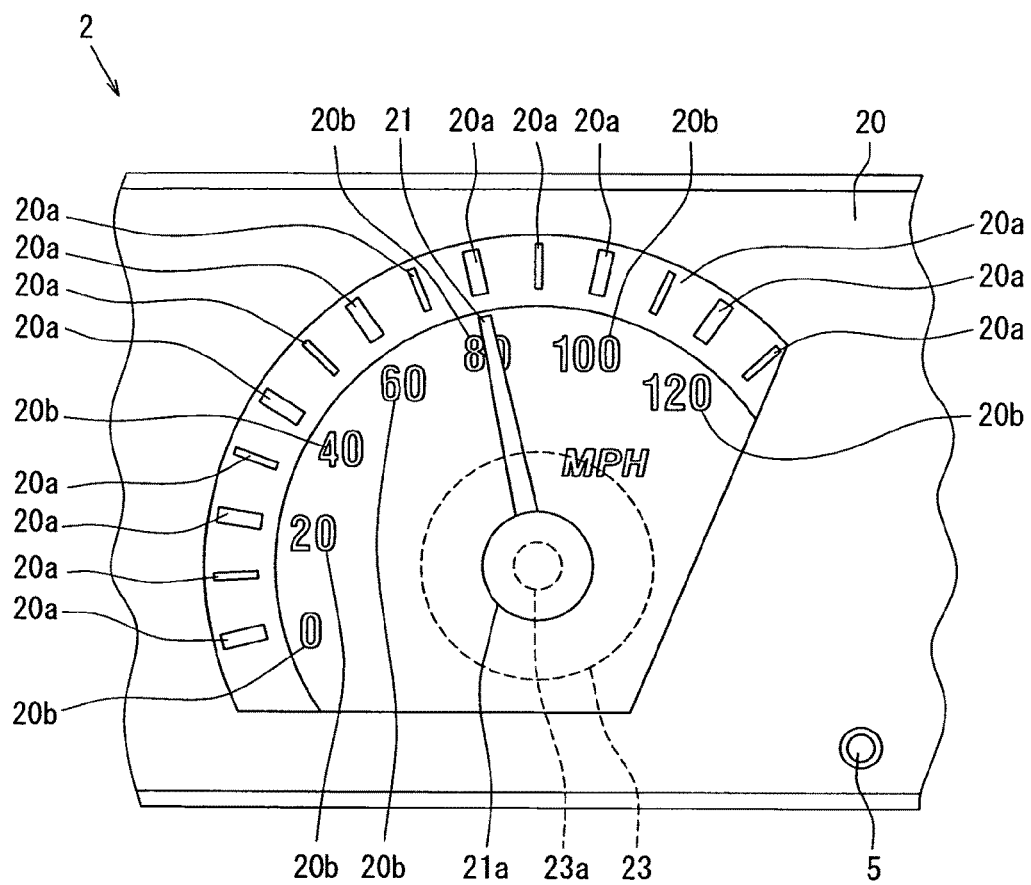
FIG. 2 is a front view illustrating a meter of the illumination controlling device.

As shown in FIG. 2, the meter 2 is an analog-type meter, and is arranged on an instrument panel ahead of a passenger compartment of the vehicle. The meter 2 has a gauge board 20, a pointer 21, a light source 22 and a drive source 23.

The gauge board 20 is produced by layering light-blocking print layers on a translucency board, for example. The gauge board 20 has a display direction heading from front to rear in the passenger compartment. The gauge board 20 has scales 20a and characters 20b as an indicator to be displayed for an occupant of the passenger compartment. The scales 20a and characters 20b are made of the translucency board exposed from through holes of the light-blocking print layers, for example, as shown in FIG. 1. Light emitted from the light source 22 passes through the scales 20a and characters 20b from front to rear in the passenger compartment. The scales 20a and characters 20 display a speed of the vehicle as vehicle information. Alternatively, the scales 20a and characters 20 may display other information such as fuel residual quantity, engine rotation number, or temperature of engine cooling water.

The pointer 21 is located in front of the gauge board 20 in the display direction. A rotating shaft 21a of the pointer 21 penetrates the gauge board 20 in the display direction, and is connected with the drive source 23, thereby the pointer 21 is rotated. The scales 20a and characters 20 are arranged along a rotation direction of the shaft 21a, and the pointer 21 points the scale 20a and character 20 in accordance with a position of the pointer 21.

The light source 22 of the meter 2 may be a light emitting diode (LED), and is located on a rear side of the gauge board 20 in the display direction. When electricity is supplied to the light source 22, light is emitted from the light source 22 toward the gauge board 20. The light passes through the scales 20a and characters 20b of the gauge board 20 in the display direction, so that the scales 20a and characters 20b are lighted up. Luminance of the scales 20a and characters 20b of the meter 2 is determined based on a luminance of the light source 22.

The drive source 23 is made of a stepping motor, for example, and is located on the rear side of the gauge board 20 in the display direction. An output shaft 23a of the drive source 23 is connected to the shaft 21a of the pointer 21. When electricity is supplied to the drive source 23, the output shaft 23a of the drive source 23 causes the pointer 21 to be rotated.

For example, an audio instrument has the lighting 3, and the lighting 3 is arranged on the instrument panel ahead of the passenger compartment. The lighting 3 has a lighting panel 30 and a light source 32.

Figures 3, 4:
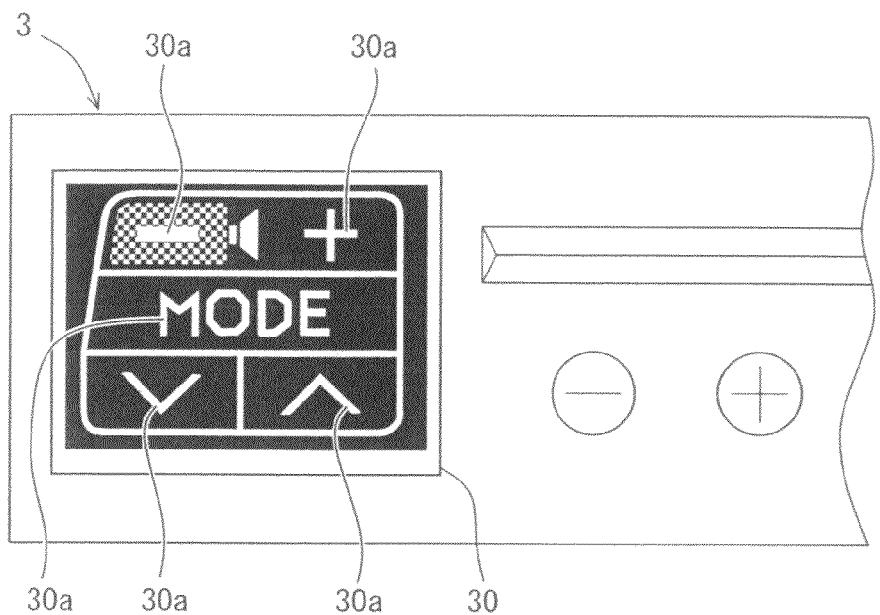
FIG. 3 is a front view illustrating a lighting of the illumination controlling device.
FIG. 4 is a view illustrating luminance phases of the meter and luminance phases of the lighting.

As shown in FIG. 3, the panel 30 is made of liquid crystal, and pixels of the liquid crystal have two-dimensional arrangement. The panel 30 has the same display direction as the gauge board 20. The panel 30 displays an information picture 30a representing an operation state of the audio instrument for the occupant of the passenger compartment. The panel 30 is electrically connected to the controller 7, and the controller 7 controls the panel 30. Alternatively, the panel 30 may be controlled by another original control device.

The light source 32 is made of a light emitting diode (LED), for example, and is located on the rear side of the panel 30 in the display direction. When electricity is supplied to the light source 32, light is emitted from the light source 32 toward the panel 30. The light passes through the panel 30 in the display direction, so that the information picture 30a of the panel 30 is lighted up. Luminance of the panel 30 is determined based on a luminance of the light source 32.

The light switch 4 is operated by a driver of the vehicle so as to turn on/off an outside lamp of the vehicle and the light source 32 of the lighting 3. If the light switch 4 is set to have a width lamp ON position or a head lamp ON position, the light source 32 and a rear lamp of the vehicle are lighted up. If the light switch 4 is set to have an all lamp OFF position, the light source 32 and the rear lamp are turned off.

The control switch 5 is operated by the driver so as to control the luminance of the gauge board 20 and the luminance of the lighting panel 30 stepwise. The control switch 5 is a push-button switch, for example. The luminance of the board 20 and the luminance of the panel 30 are changed by one-step by one-operation of the control switch 5.

The number of luminance phases of the board 20 is set the same as that of luminance phases of the panel 30. For example, the number of luminance phases is set as seven in this embodiment. As shown in FIG. 4, the luminance phase is changed from a bright side to a dark side per operation of the control switch 5. When the luminance phase reaches the darkest phase correspOnding to Step7, the luminance phase is returned to the brightest phase corresponding to Step1 by the next operation of the switch 5.

The illuminance sensor 6 is a light detector such as phototransistor or photodiode, for example, and is disposed on an upper part of the instrument panel ahead of the passenger compartment. The illuminance sensor 6 detects intensity of outside light passing through a front windshield of the vehicle. An environment around the vehicle is determined to be bright or dark based on the detected intensity.

The controller 7 is a microcomputer having a memory 70, for example, and is arranged inside of the meter 2 on the rear side of the gauge board 20 in the display direction. The memory 70 memorizes tables Ta, Tb about the luminance phase of the board 20, and memorizes a table Tc about the luminance phase of the panel 30.

As shown in FIG. 4, the memory 70 memorizes the bright environment table Ta and the dark environment table Tb as the table about the luminance phase of the board 20. The bright environment table Ta is used for daytime during which the vehicle is in a bright environment. The dark environment table Tb is used for nighttime during which the vehicle is in a dark environment. The table Tc about the luminance phase of the panel 30 is used while the light source 32 is activated. Each table Ta, Tb, Tc is defined to have the brightest phase Step1 corresponding 100%, and the other phases Step2-Step7 are defined by percentages relative to the brightest phase. A changing rate of the luminance phases is different among the tables Ta, Tb, Tc.

As shown in FIG. 1, the memory 70 of the controller 7 memorizes values Ma, Mb about the luminance phase of the board 20, and memorizes a value Mc about the luminance phase of the panel 30. The values Ma, Mb, Mc are changed in accordance with the tables Ta, Tb, Tc, respectively.

Specifically, the controller 7 updates the bright environment value Ma when the luminance phase of the gauge board 20 is changed in accordance with the bright environment table Ta while the vehicle is in the bright environment. The controller 7 updates the dark environment value Mb when the luminance phase of the gauge board 20 is changed in accordance with the dark environment table Tb while the vehicle is in the dark environment. The controller 7 updates the value Mc about the luminance phase of the panel 30 when the luminance phase of the panel 30 is changed in accordance with the table Tc. Further, the controller 7 updates the dark environment value Mb when the luminance phase of the panel 301 is changed in accordance with the table Tc.

The controller 7 is electrically connected to the light sources 22, 32, the drive source 23, the switches 4, 5 and the illuminance sensor 6. Further, the controller 7 is electrically connected to a vehicle sensor 8 so as to obtain information to be displayed on the meter 2 such as speed information. The controller 7 controls electricity supply to the light source 22, 32 in accordance with operation of the switch 4, 5 and output of the illuminance sensor 6. The controller 7 controls electricity supply to the drive source 23 in accordance with output of the vehicle sensor 8.

The light source 22 is controlled in a manner that the luminance of the board 20 corresponds to the value Ma, Mb. The light source 32 is controlled in a manner that the luminance of the panel 30 corresponds to the value Mc. A control program for controlling the luminance of the board 20 and the luminance of the panel 30 will be specifically described below.

Figure 5:
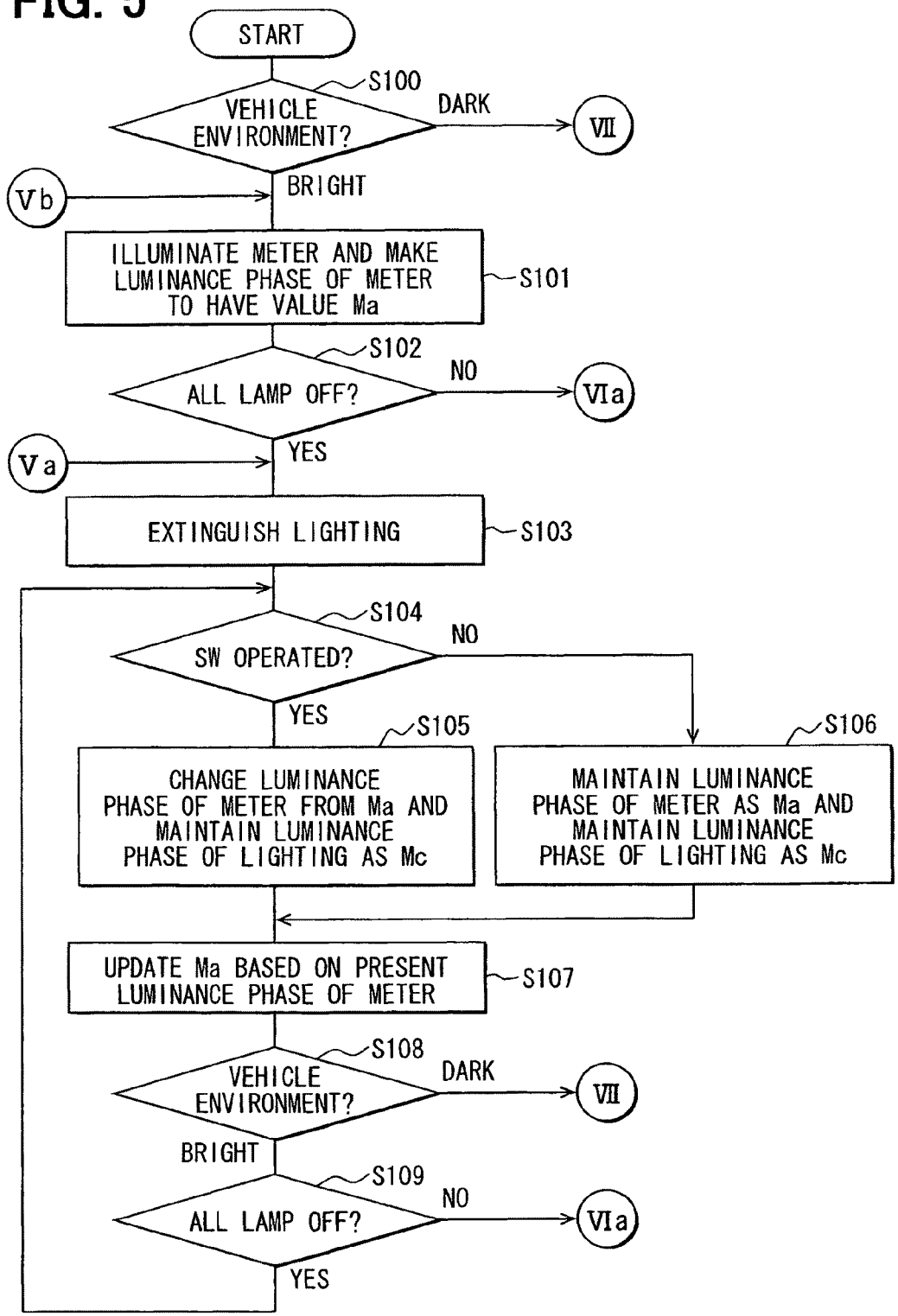
FIG. 5 is a flow chart illustrating a control performed by the illumination controlling device.
Figure 6:
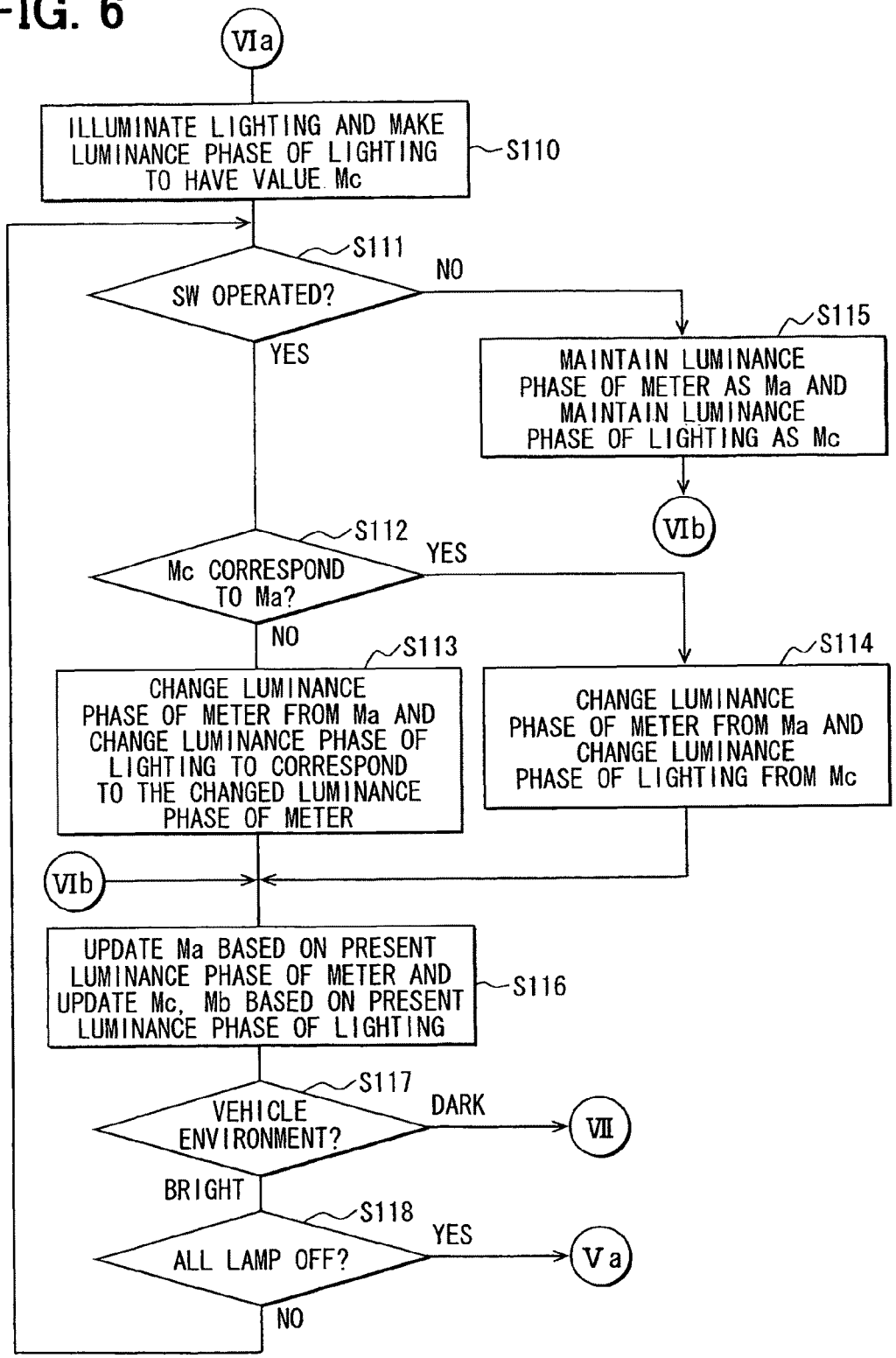
FIG. 6 is a flow chart illustrating a control performed by the illumination controlling device.

The controller 7 executes control program of FIGS. 5, 6 and 7, which is memorized in the memory 70 in advance. The control program is started when an engine switch of the vehicle is turned on, and is ended when the engine switch is turned off.

At S100 of FIG. 5, the environment of the vehicle is determined to be bright or dark based on the output of the illuminance sensor 6. If an outside light intensity is equal to or higher than a predetermined value, the environment of the vehicle is determined to be bright and S101 is performed. If the outside light intensity is lower than the predetermined value, the environment of the vehicle is determined to be dark and S119 of FIG. 7 is performed.

At S101, the light source 22 of the meter 2 is activated, and the luminance phase of the board 20 is made to correspond to the value Ma of the memory 70.

At S102, the light switch 4 is determined to have the all lamp OFF position or not. If the light switch 4 is determined to have the all lamp OFF position, S103 is performed. If the light switch 4 is determined not to have the all lamp OFF position, S110 of FIG. 6 is performed.

At S103, the light source 32 of the panel 30 is turned off.

At S104, the control switch 5 is determined to be operated or not in a predetermined period. If the control switch 5 is determined to be operated, the luminance phase of the board 20 is changed by one from the value Ma based on the table Ta, and the luminance phase of the panel 30 is maintained as the value Mc, at S105. If the control switch 5 is determined not to be operated, the luminance phase of the board 20 is maintained as the value Ma, and the luminance phase of the panel 30 is maintained as the value Mc, at S106.

S107 is performed after S105 or S106. The value Ma of the memory 70 is updated based on the present luminance phase of the board 20 at S107. At this time, the value Mc and the value Mb correspond with each other.

After S107, if the environment of the vehicle is determined to be bright at S108, and if the light switch 4 is determined to have the all lamp OFF position at S109, the control program is returned to S104. Therefore, when the light source 32 of the panel 30 is not activated while the vehicle is in the bright environment, the luminance phase of the panel 30 is maintained, and the luminance phase of the board 20 is changed based on the operation of the control switch 5.

If the environment of the vehicle is determined to be dark at S108, S119 of FIG. 7 is performed. If the light switch 4 is determined not to have the all lamp OFF position at S109, S110 of FIG. 6 is performed.

If the light switch 4 has the width lamp ON position or the front lamp ON position at S102 or S109, the light source 32 of the panel 30 is activated at S110 of FIG. 6. Further, the luminance phase of the panel 30 is made correspond to the value Mc at S110.

At S111, the control switch 5 is determined to be operated or not in a predetermined period. If the control switch 5 is determined to be operated, S112 is performed. If the control switch 5 is determined not to be operated, S115 is performed.

At S112, the luminance phase of the panel 30 is determined whether to correspond to the luminance phase of the board 20. That is, the value Mc is determined to correspond to the value Ma or not.

If the value Mc is determined not to correspond to the value Ma, the luminance phase of the board 20 is changed by one phase from the value Ma based on the table Ta, and the luminance phase of the panel 30 is made to correspond to the changed luminance phase of the board 20, at S113.

If the value Mc is determined to correspond to the value Ma, the luminance phase of the board 20 is changed by one phase from the value Ma based on the table Ta, and the luminance phase of the panel 30 is changed by one phase from the value Mc based on the table Tc, at S114.

That is, the luminance phases of the board 20 and the panel 30 are changed in a state that the phases correspond to each other.

In contrast, if the control switch 5 is determined not to be operated at S111, the luminance phase of the board 20 is maintained as the value Ma, and the luminance phase of the panel 30 is maintained as the value Mc, at S115, similar to S106.

S116 is performed after S113, S114 or S115. The value Ma of the memory 70 is updated based on the present luminance phase of the board 20 at S116. Further, the values Mc and Mb of the memory 70 are updated based on the present luminance phase of the panel 30 at S116.

If the environment of the vehicle is determined to be bright at S117, and if the light switch 4 is determined not to have the all lamp OFF position at S118, the control program is returned to S111. Therefore, in a case where the light source 32 is activated while the vehicle is in the bright environment, and where the luminance phase is different between the board 20 and the panel 30, if the control switch 5 is operated as a trigger, the luminance phases are changed to correspond with each other between the board 20 and the panel 30.

If the environment of the vehicle is determined to be dark at S117, S119 of FIG. 7 is performed. If the light switch 4 is determined to have the all lamp OFF position at S118, S103 of FIG. 5 is performed.

A case where the vehicle is determined to be in the dark environment at S100, S108 or S117 will be described with reference to FIG. 7.

At S119, the light source 22 of the meter 2 is activated, and the luminance phase of the board 20 is made to correspond to the value Mb of the memory 70. At S120, the light source 32 of the panel 30 is activated, and the luminance phase of the panel 30 is made to correspond to the value Mc of the memory 70. At this time, because the values Mb, Mc are configured to correspond with each other, the luminance phases correspond with each other between the board 20 and the panel 30.

At S121, the control switch 5 is determined to be operated or not in a predetermined period. If the control switch 5 is determined to be operated, the luminance phase of the board 20 is changed from the value Mb by one phase based on the table Tb, and the luminance phase of the panel 30 is changed from the value Mc by one phase based on the table Tc, at S122. If the control switch 5 is determined not to be operated, the luminance phase of the board 20 is maintained as the value Ma, and the luminance phase of the panel 30 is maintained as the value Mc, at S123.

S124 is performed after S122 or S123. The value Mb of the memory 70 is updated based on the present luminance phase of the board 20, and the value Mc of the memory 70 is updated based on the present luminance phase 30 of the panel 30, at S124. If the vehicle is determined to be in the dark environment at S125, S121 is performed. If the vehicle is determined to be in the bright environment at S125, S101 of FIG. 5 is performed.

According to the first embodiment, when the light source 32 of the panel 30 is not activated while the vehicle is in the bright environment, the luminance phase of the board 20 is changed based on the operation of the control switch 5, and the luminance phase of the panel 30 is maintained even if the switch 5 is operated.

As shown in FIG. 8, in a case where the luminance phase Step1 of the board 20 of the meter 2 is different from the luminance phase Step5 of the panel 30 of the lighting 3, if the light source 32 of the panel 30 of the lighting 3 is activated with the luminance phase Step5 while the vehicle is in the bright environment, the occupant of the vehicle may feel the difference of the luminance phases strange.

However, according to the first embodiment, if the control switch 5 is operated as a trigger in this situation, the luminance phases are immediately made to correspond to each other such as Step2 between the board 20 of the meter 2 and the panel 30 of the lighting 3. Therefore, in a case where the luminance phase is different between the board 20 and the panel 30 while the light source 32 is not activated, the luminance phases can be made to correspond to each other between the board 20 and the panel 30 when the light source 32 is activated. Thus, a lighting situation of the passenger compartment can be made suitable for the occupant without giving the feeling of strangeness.

The meter 2 having the gauge board 20 and the light source 22 may correspond to a meter of the present invention. The lighting 3 having the lighting panel 30 and the light source 32 may correspond to a lighting other than the meter. The light switch 4 may correspond to an operation switch. The control switch 5 may correspond to an illumination operating portion. The controller 7 may correspond to a controlling portion. The controller 7 to execute S103-S109 may correspond to an extinguished state controller. The controller 7 to execute S110-S118 may correspond to an illuminated state controller. The controller 7 to execute S100, S108, S117, S125 may correspond to a determining portion.

(Second Embodiment)

Figure 9:
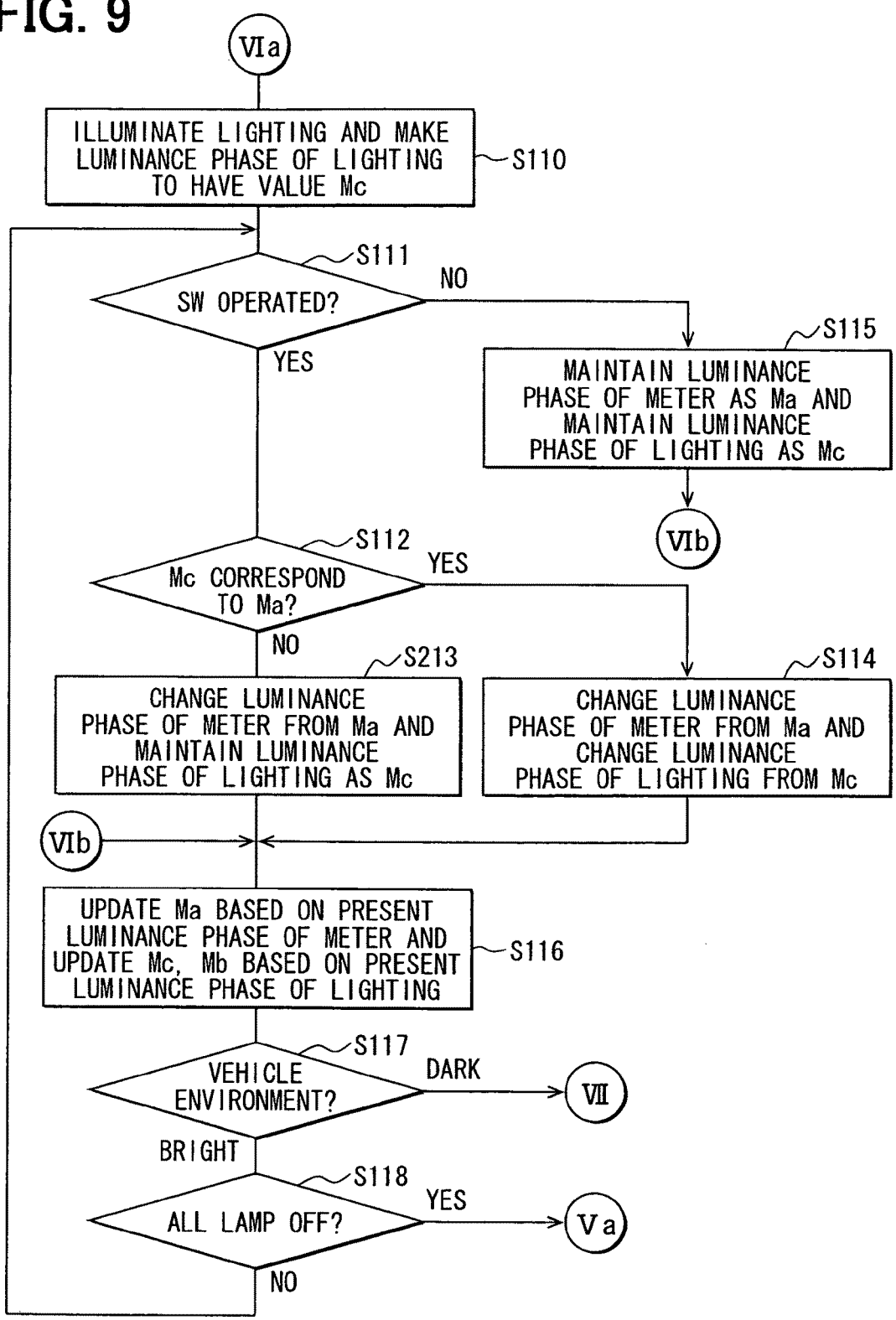
FIG. 9 is a flow chart illustrating a control performed by an illumination controlling device according to a second embodiment.

A second embodiment is a modification of the first embodiment, and will be described with reference to FIGS. 9 and 10. If the values Ma, Mc of the memory 70 are determined to be different from each other at S112 of FIG. 9, S213 is performed in place of S113 of the first embodiment.

Specifically, the luminance phase of the board 20 is changed by one phase from the value Ma based on the table Ta, and the luminance phase of the panel 30 is maintained as the value Mc, at S213. S116 is performed after S213, S114 or S115.

As shown in FIG. 10, if the control switch 5 is operated as an initial trigger in a state that the luminance phase Step1 of the board 20 is different from the luminance phase Step5 of the panel 30, the luminance phase Step5 of the panel 30 is maintained until the luminance phase of the board 20 becomes correspond to the luminance phase of the panel 30.

According to the second embodiment, if the luminance phase of the board 20 is different from the luminance phase of the panel 30 while the light source 32 of the panel 30 is not activated, it is possible to make the luminance phases to correspond with each other between the board 20 and the panel 30. Thus, a lighting situation of the passenger compartment can be made suitable kr the occupant without giving the feeling of strangeness. The controller 7 to execute S110-S112, S213, S114-S118 may correspond to an illuminated state controller.

(Third Embodiment)

Figure 11:
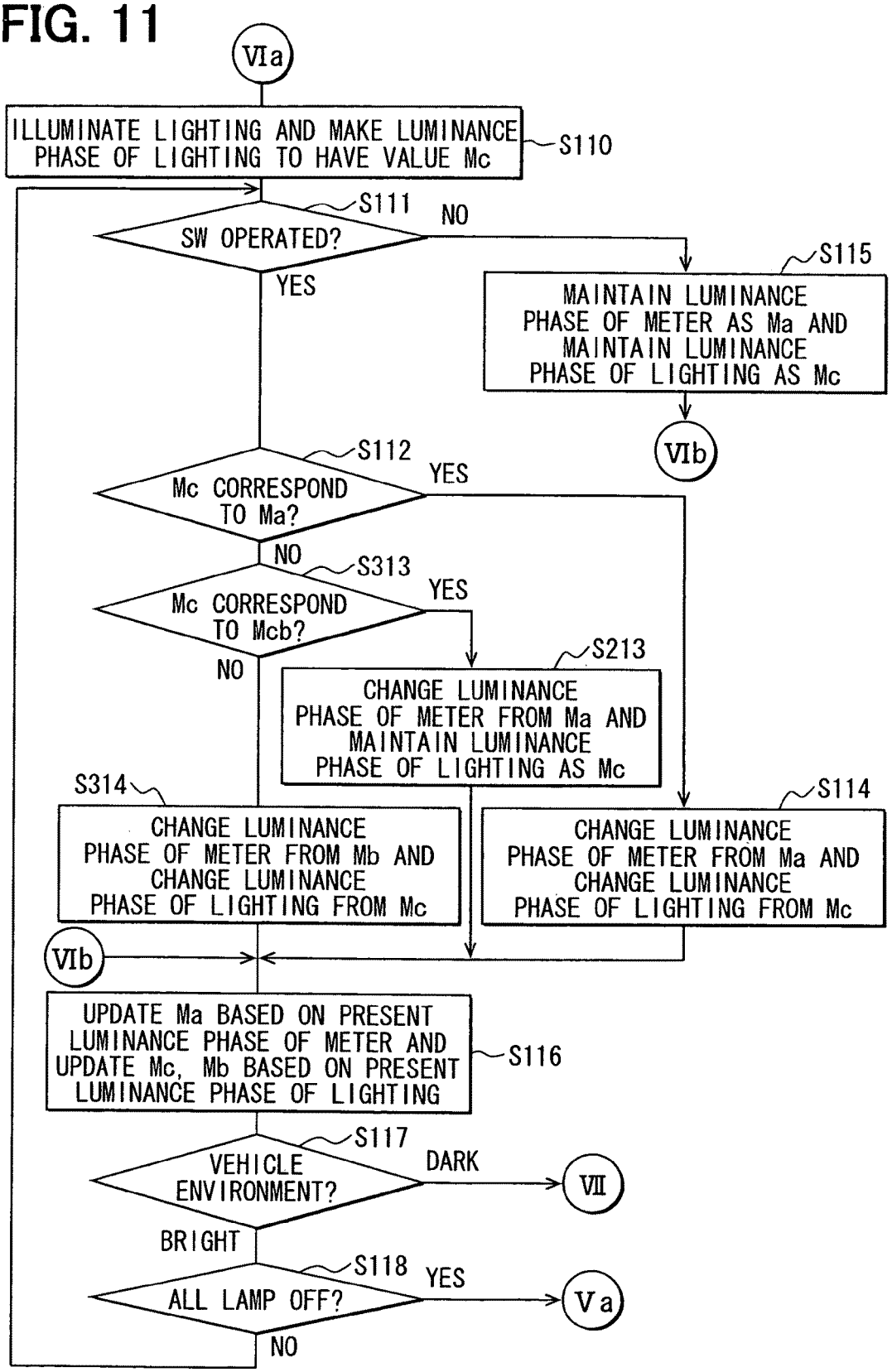
FIG. 11 is a flow chart illustrating a control performed by an illumination controlling device according to a third embodiment.

A third embodiment is a modification of the second embodiment, and will be described with reference to FIGS. 11 and 12. As shown in FIG. 11, if the values Ma, Mc of the memory 70 are determined to be different from each other at S112, S313 is performed before S213.

The present value Mc of the memory 70 is determined to correspond to a predetermined standard phase Mcb or not at S313. The standard phase Mcb is selected among the luminance phases in advance. For example, as shown in FIG. 12, the standard phase Mcb may be the darkest phase Step7.

If the present value Mc of the memory 70 is determined to be different from the standard phase Mcb at S313, S314 is performed. The luminance phase of the board 20 is changed from the value Ma by one phase based on the table Ta, and the luminance phase of the panel 30 is changed from the value Mc by one phase based on the table Tc, at S314. That is, the luminance phases are changed in a state that the luminance phases are different between the board 20 of the meter 2 and the panel 30 of the lighting 3.

If the present value Mc of the memory 70 is determined to correspond to the standard phase Mcb at S313, the luminance phase of the panel 30 is maintained, and only the luminance phase of the gauge board 20 is changed, at S213. That is, the luminance phase of the panel 30 is made to correspond to the standard phase Mcb at S213.

S116 is performed after S314, S213, S114 or S115.

According to the third embodiment, as shown in FIG. 12, if the control switch 5 is operated as an initial trigger in a state that the luminance phase Step1 of the board 20 is different from the luminance phase Step5 of the panel 30, the luminance phases of the meter 2 and the lighting 3 are changed in the different state while the luminance phase of the panel 30 is different from the standard phase. Mcb such as Step7. If the luminance phase of the panel 30 of the lighting 3 becomes correspond to the standard phase Mcb, the luminance phase of the panel 30 of the lighting 3 is maintained as the standard phase Mcb, and the luminance phase of the board 20 of the meter 2 is made correspond to the luminance phase of the panel 30 corresponding to the standard phase Mcb.

According to the third embodiment, in a case where the luminance phase is different between the board 20 and the panel 30 while the light source 32 of the panel 30 is not activated, it is possible to make the luminance phases of the board 20 and the panel 30 to correspond with each other. Thus, a lighting situation of the vehicle can be made suitable for the occupant without giving the feeling of strangeness.

The controller 7 to execute S110-S112, S313, S314, S213, S114-S118 may correspond to an illuminated state controller.

(Other Embodiment)

The above embodiments may be modified within a scope of the present invention.

The meter 2 may be a digital one having liquid crystal panel, for example. The lighting 3 other than the meter 2 is not limited to the audio instrument having the lighting panel 30 and the light source 32. The lighting 3 may be an air-conditioner, a shift lever or a switch having a lighting other the meter 2. The operation switch to turn on/off the lighting 3 and the lamp of the vehicle is not limited to the light switch 4, and may be another original switch set for turning on/off the lighting 3. The luminance phase may be changed from the dark side to the bright side. In this case, if the luminance phase reaches the brightest one, the luminance phase is returned to the darkest one by the next operation of the control switch 5. The control program of FIG. 6, 9 or 11 set for the case where the vehicle is in the bright environment may be reflected into the control program of FIG. 7 set for the case where the vehicle is in the dark environment.

Such changes and modifications are to be understood as being within the scope of the present invention as defined by the appended claims.

What is claimed is:

1. An illumination controlling device for a vehicle comprising:
   a meter to display information of the vehicle;
   a lighting located in a passenger compartment of the vehicle;
   an operation switch to be operated for turning on/off the lighting;
   an illumination operating portion to be operated for controlling a luminance of the meter and a luminance of the lighting stepwise; and
   a controlling portion to control the meter and the lighting based on operations of the operation switch and the illumination operating portion, wherein
   the meter is set to have a plurality of luminance phases, and the lighting is set to have a plurality of luminance phases, the number of the luminance phases being equal between the meter and the lighting,
   the controlling portion controls the luminance of the meter or the luminance of the lighting in accordance with the luminance phases,
   the controlling portion has
      an extinguished state controller to change the luminance phase of the meter based on the operation of the operating portion and to maintain the luminance phase of the lighting while the lighting is extinguished by the operation switch, and
      an illuminated state controller to change the luminance phase of the meter based on the operation of the operating portion and to change the luminance phase of the lighting to correspond to the luminance phase of the meter if the operating portion is operated in a state that the luminance phase is different between the meter and the lighting while the lighting is illuminated by the operation switch.

2. The illumination controlling device according to claim 1, wherein
   the illuminated state controller changes the luminance phase of the meter and the luminance phase of the lighting in a manner that the luminance phase of the meter and the luminance phase of the lighting correspond with each other, if the operating portion is operated in a state that the luminance phase of the meter and the luminance phase of the lighting correspond with each other while the lighting is illuminated by the operation switch.

3. The illumination controlling device according to claim 1, wherein
   the controlling portion further has a determiner to determine an environment of the vehicle to be bright or dark,
   the extinguished state controller changes the luminance phase of the meter based on the operation of the operating portion and maintains the luminance phase of the lighting, when the determiner determines the environment of the vehicle to be bright, and
   the illuminated state controller changes the luminance phase of the meter based on the operation of the operating portion and changes the luminance phase of the lighting to correspond to the luminance phase of the meter if the operating portion is operated in the state that the luminance phase is different between the meter and the lighting, when the determiner determines the environment of the vehicle to be bright.

4. The illumination controlling device according to claim 1, wherein
   the illuminated state controller detects a trigger operation of the operating portion in the state that the luminance phase is different between the meter and the lighting while the lighting is illuminated by the operation switch, and
   the illuminated state controller changes the luminance phase of the meter based on the operation of the operating portion when or after the trigger operation is detected, and changes the luminance phase of the lighting to correspond to the luminance phase of the meter.

5. The illumination controlling device according to claim 1, wherein
   the illuminated state controller detects a trigger operation of the operating portion in the state that the luminance phase is different between the meter and the lighting while the lighting is illuminated by the operation switch,
   the illuminated state controller changes the luminance phase of the meter based on the operation of the operating portion and maintains the luminance phase of the lighting, until the luminance phase of the meter becomes correspond to the luminance phase of the lighting, if the trigger operation is detected, and
   the illuminated state controller changes the luminance phase of the meter based on the operation of the operating portion and changes the luminance phase of the lighting to correspond to the luminance phase of the meter, if the luminance phase of the meter becomes correspond to the luminance phase of the lighting after the trigger operation.

6. The illumination controlling device according to claim 1, wherein
   the illuminated state controller detects a trigger operation of the operating portion in the state that the luminance phase is different between the meter and the lighting while the lighting is illuminated by the operation switch,
   the illuminated state controller changes the luminance phase of the meter and the luminance phase of the lighting based on the operation of the operating portion in a state that the luminance phase of the meter and the luminance phase of the lighting are different from each other, while the luminance phase of the lighting is different from a predetermined standard phase, if the trigger operation is detected,
   the illuminated state controller changes the luminance phase of the meter based on the operation of the operating portion and maintains the luminance phase of the lighting until the luminance phase of the meter becomes correspond to the luminance phase of the lighting if the luminance phase of the lighting becomes correspond to the standard phase after the trigger operation, and
   the illuminated state controller changes the luminance phase of the meter based on the operation of the operating portion and changes the luminance phase of the lighting to correspond to the luminance phase of the meter if the luminance phase of the lighting becomes correspond to the standard phase and if the luminance phase of the meter becomes correspond to the luminance phase of the lighting after the trigger operation.

* * * * *